United States Patent

Higuchi

[11] Patent Number: 6,147,554
[45] Date of Patent: Nov. 14, 2000

[54] CONTROL SIGNAL AMPLIFICATION CIRCUIT

[75] Inventor: Yoshio Higuchi, Osaka, Japan

[73] Assignee: Funai Electric Co., Ltd., Osaka, Japan

[21] Appl. No.: 09/220,498

[22] Filed: Dec. 24, 1998

[30] Foreign Application Priority Data

Dec. 26, 1997 [JP] Japan .................................. 9-011320

[51] Int. Cl.[7] .................................................. H03F 1/36
[52] U.S. Cl. .............................. 330/86; 330/282; 360/46
[58] Field of Search .......................... 330/86, 282, 110; 360/46, 67, 68

[56] References Cited

U.S. PATENT DOCUMENTS

| | | | |
|---|---|---|---|
| 4,450,413 | 5/1984 | Fujibayashi | 330/86 |
| 4,755,771 | 7/1988 | Sakaida et al. | 330/86 |
| 4,967,163 | 10/1990 | Kietzer | 330/86 |
| 5,621,353 | 4/1997 | Botti et al. | 330/85 |

Primary Examiner—Robert Pascal
Assistant Examiner—Khanh Van Nguyen
Attorney, Agent, or Firm—Lackenbach Siegel Marzullo Aronson & Greenspan

[57] ABSTRACT

A control signal amplification circuit for amplifying a control signal reproduced by a control head. The control signal amplification circuit includes a level detection circuit for detecting an output level of an amplification circuit body having an amplification factor determined on the basis of the quantity of negative feedback to thereby send out a level control signal indicating a result of the detection, and a variable feedback resistance circuit which is connected between a minus-input terminal and an output terminal of the amplification circuit body so that the equivalent resistance value of the variable feedback resistance circuit decreases when the level control signal indicates the increase of the output level, and the equivalent resistance value of the variable feedback resistance circuit increases when the level control signal indicates the decrease of the output level, whereby the control signal is amplified without deformation of its waveform.

4 Claims, 5 Drawing Sheets

CONTROL SIGNAL AMPLIFICATION CIRCUIT

BACKGROUND OF THE INVENTION

1. Field of the Invention

The present invention relates to an amplification circuit for amplifying a control signal reproduced by a control head of a video tape reproducing apparatus and particularly to a control signal amplification circuit in which the quantity of negative feedback is controlled so that the output level of the amplification circuit is kept constant.

2. Description of the Related Art

In a video tape reproducing apparatus such as a video cassette deck, or the like, the rotation of a rotary head and the running of a video tape are synchronized with each other on the basis of the output of a control head for reproducing a control signal when the video tape is made to run. On the other hand, a magnetic head wound with a coil is used as the control head. Accordingly, when the running speed of the video tape varies in accordance with the operation difference in kind, for example, between "standard-playing mode" and "long-playing mode" or between "normal play" and "special play", the output level of the control head changes greatly. Therefore, the amplification factor of an amplification circuit for amplifying the control signal reproduced by the control head must be changed in accordance with the running speed of the video tape.

Figure 5:
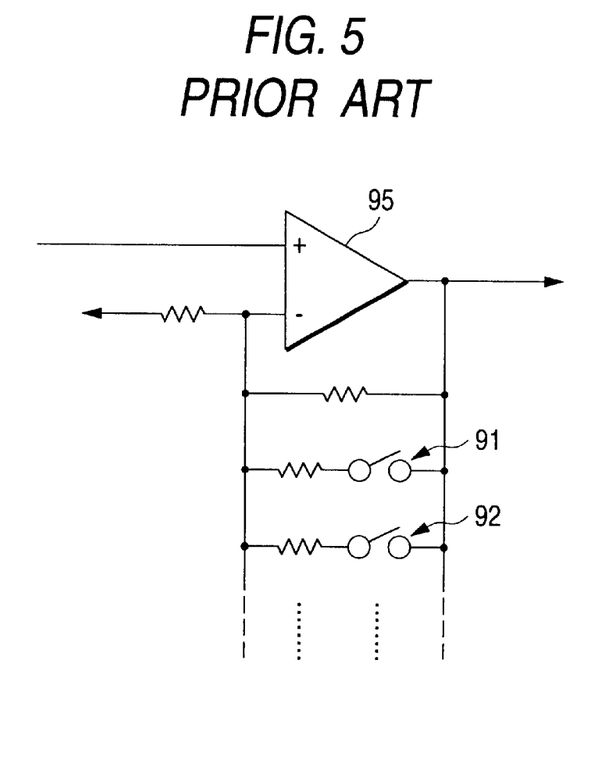
FIG. 5 is a circuit diagram showing a conventional control signal amplification circuit.

FIG. 5 shows a conventional basic circuit in which the amplification factor can be changed. That is, in this conventional technique, the respective connection conditions of a plurality of switches 91, 92, . . . are changed to change the quantity of negative feedback of an operational amplifier 95 to thereby obtain the optimum amplification factor for the running speed of the video tape. In the aforementioned configuration, however, the respective connection conditions of the switches 91, 92, . . . must be controlled in accordance with the running speed of the video tape. Accordingly, there arises a problem that the control of the switches 91, 92, . . . becomes complex and therefore the program used in a microcomputer for controlling the switches becomes complex.

Figure 6:
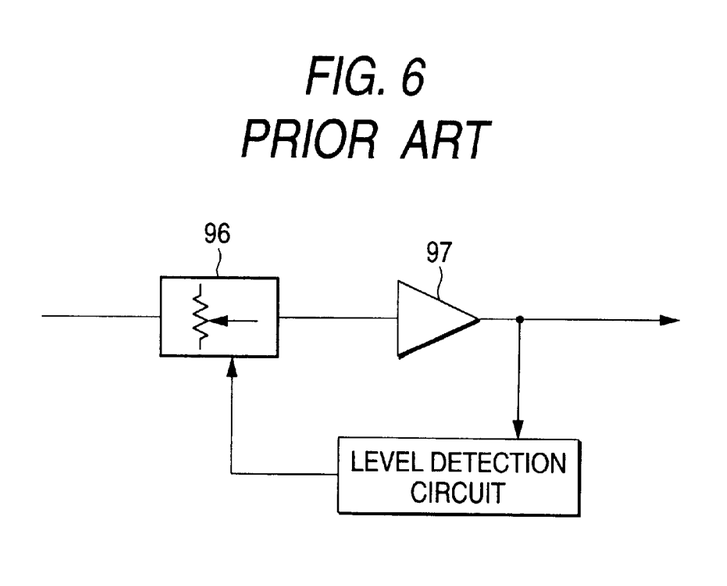
FIG. 6 is a circuit diagram showing a conventional control signal amplification circuit having an amplification factor controlled automatically.

To solve this problem, it will do to provide an automatic level control (hereinafter merely referred to as "ALC") for automatically changing the amplification factor of the amplification circuit to thereby keep the output level of the operational amplifier constant. To this end, as shown in FIG. 6, a conventional amplification circuit having an ALC function has been proposed. That is, in the proposed technique, the control signal is led to an amplifier 97 through an attenuator 96 in which the quantity of attenuation changes in accordance with a control voltage. Further, the quantity of attenuation in the attenuator 96 is controlled in accordance with a control signal based on the output level of the amplifier 97 so that the output level of the amplifier 97 is kept constant.

In the case where the aforementioned configuration is used, however, a problem arises as follows. That is, since the through-rate of the operational amplifier used as the amplifier 97 is constant, the open-loop gain decreases as the frequency increases. On the other hand, in the configuration shown in FIG. 6, the operational amplifier constituting the amplifier 97 is set to have the optimum amplification factor when the level of the control signal is smallest. That is, the operational amplifier is set so as to operate with a very large amplification factor. As a result, the frequency range in which signal amplification can be performed with the set amplification factor is limited to a frequency range in which the open-loop gain of the operational amplifier is kept to have a sufficient value. Accordingly, to amplify the control signal without deformation when the video tape runs at a high speed, an expensive operational amplifier good in frequency characteristic must be used as the operational amplifier constituting the amplifier 97.

SUMMARY OF THE INVENTION

The present invention is designed to solve the aforementioned problems and an object of the present invention is to provide a control signal amplification circuit in which the quantity of negative feedback is controlled automatically so that a control signal can be amplified without deformation of its waveform even in the case where the control signal contains a signal component of a frequency band in which the open-loop gain decreases.

In order to achieve the above object, according to the present invention, there is provided a control signal amplification circuit for amplifying a control signal reproduced by a control head, comprising: a level detection circuit for detecting an output level of an amplification circuit body having an amplification factor determined on the basis of a quantity of feedback fed back from an output terminal of the amplification circuit body to a minus-input terminal of the amplification circuit body to thereby send out a level control signal indicating a result of the detection; and a variable feedback resistance circuit which is connected between the minus-input terminal and the output terminal of the amplification circuit body so that an equivalent resistance value of the variable feedback resistance circuit decreases when the level control signal indicates increase of the output level, and the equivalent resistance value of the variable feedback resistance circuit increases when the level control signal indicates decrease of the output level.

That is, the frequency of the control signal becomes high when the running speed of the video tape becomes high. Accordingly, when the frequency of the control signal is high, the level of the control signal becomes high. That is, when the frequency of the control signal is high, the negative feedback quantity of the amplification circuit body becomes large. On the other hand, in the amplification circuit body in which the amplification factor is determined on the basis of the quantity of feedback from the output terminal to the minus-input terminal, the frequency band allowed to be used is widened in the high frequency side when the quantity of feedback becomes large so that the amplification circuit body operates with a low amplification factor. Accordingly, when a control signal of a high frequency is to be amplified, the amplification circuit body operates in a state in which the frequency band allowed to be used is widened in the high frequency side.

DETAILED DESCRIPTION OF THE PREFERRED EMBODIMENT

An embodiment of the present invention will be described below with reference to the drawings.

Figure 1:
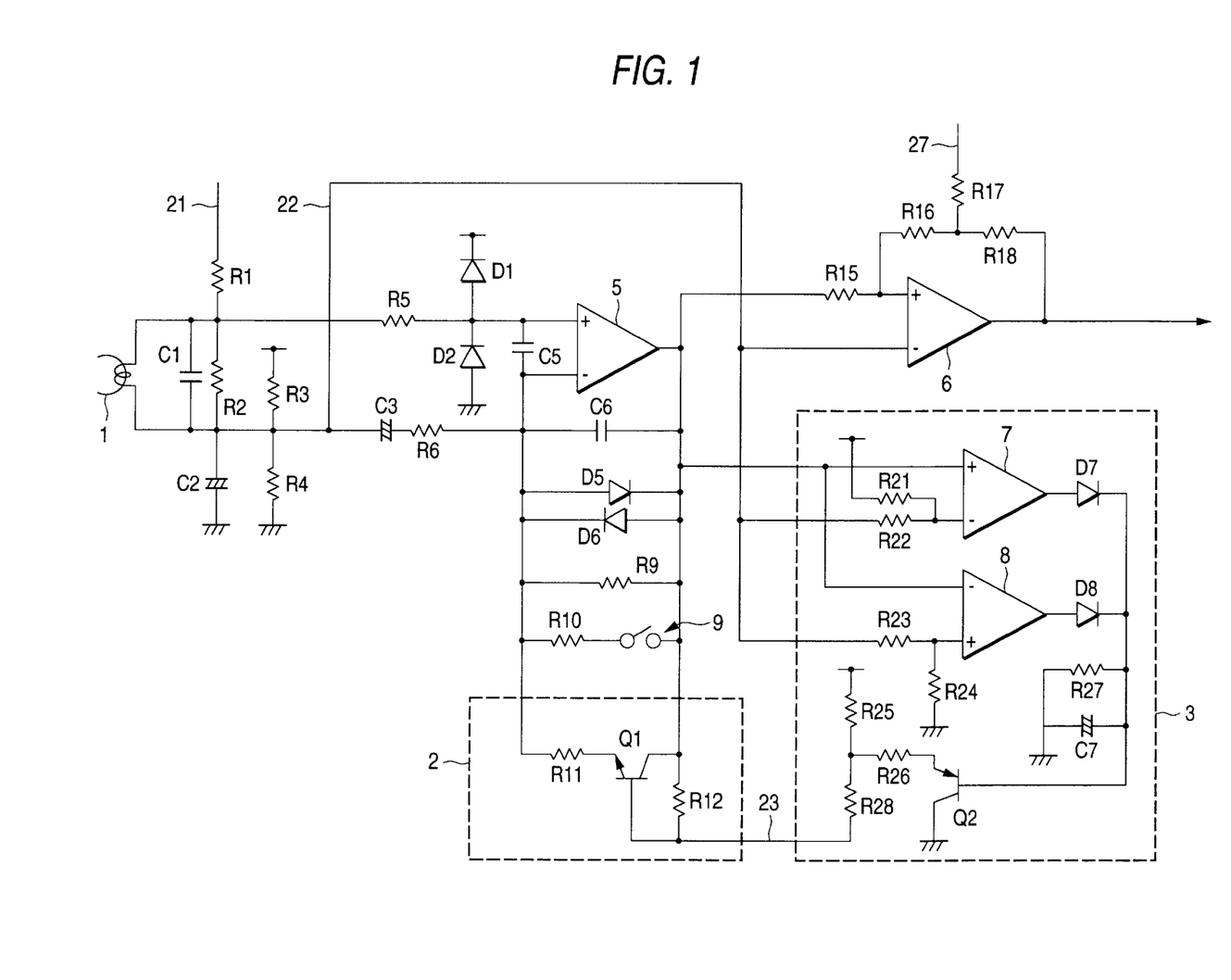
FIG. 1 is a circuit diagram showing the electrical connection of a control signal amplification circuit as an embodiment of the present invention.

FIG. 1 is a circuit diagram showing the electrical connection of a control signal amplification circuit as the embodiment of the present invention.

In FIG. 1, a capacitor C1 and a resistor R2 acting as impedance matching elements are connected in parallel to a control head 1 which reproduces a control signal recorded on a video tape. Further, a signal line 21 to which recording control pulses are led is connected to one terminal of the control head 1 through a resistor R1. Further, the output of a voltage divider constituted by resistors R3 and R4 is applied to the other terminal of the control head 1. Further, a capacitor C2 connected between the other terminal of the control head 1 and the ground level reduces the output impedance of the divided voltage and connects the other terminal of the control head 1 to the ground in terms of alternating current.

A resistor R5 having one terminal connected to one terminal of the control head 1, a diode D1 having an anode connected to the other terminal of the resistor R5 and a cathode connected to the plus level, and a diode D2 having a cathode connected to the other terminal of the resistor R5 and an anode connected to the ground serve as elements for protecting an operational amplifier 5 from an abnormal voltage when the abnormal voltage is induced in a signal path continued from the control head 1. Further, a capacitor C3 having one terminal connected to the other terminal of the control head 1, and a resistor R6 having one terminal connected to the other terminal of the capacitor C3 and the other terminal connected to the minus-input terminal of the operational amplifier 5 serve as elements for determining the amplification factor of the operational amplifier 5.

The operational amplifier 5, which is an amplification circuit body, amplifies a control signal reproduced by the control head 1. Further, a capacitor C5 connected between the plus- and minus-input terminals of the operational amplifier 5 serves as an element for absorbing an abnormal voltage produced by high-frequency induction. Further, a capacitor C6 connected between the output and minus-input terminals of the operational amplifier 5 serves as an element for preventing abnormal oscillation of the operational amplifier 5.

A resistor R9 connected between the output and minus-input terminals of the operational amplifier 5 makes a pair with the resistor R6 to thereby determine the reference amplification factor of the operational amplifier 5. Further, a pair of diodes D5 and D6 connected in parallel to the resistor R9 in reverse directions serve as elements for bringing the amplification factor of the operational amplifier 5 approximately to 1 to thereby prevent the saturation of the operational amplifier 5 when the output level of the operational amplifier 5 exceeds the forward voltage.

A series circuit constituted by a resistor R10 having one terminal connected to the minus-input terminal of the operational amplifier 5, and a switch 9 having one terminal connected to the other terminal of the resistor R10 and the other terminal connected to the output terminal of the operational amplifier 5, serves as a circuit for reducing the amplification factor of the operational amplifier 5 at the time of "fast feed" or "rewind". Accordingly, at the time of "fast feed" or "rewind", connection of the switch 9 is closed by a control section (not shown). Incidentally, the amplification factor of the operational amplifier 5 in the case where the connection of the switch 9 is opened and an NPN transistor Q1 is turned off, that is, the amplification factor of the operational amplifier 5 set on the basis of the resistors R6 and R9 is of the order of hundreds of times.

An operational amplifier 6 serves a comparator for two-valuing or binarizing the control signal amplified by the operational amplifier 5. That is, a series circuit constituted by resistors R16 and R18 is connected between the plus-input and output terminals of the operational amplifier 6. Further, a resistor R15 is put between the output terminal of the operational amplifier 5 and the plus-input terminal of the operation amplifier 6. Accordingly, hysteresis determined on the basis of the resistance value of the series circuit of the resistors R16 and R18 and the resistance value of the resistor R15 is given to the operational amplifier 6.

Further, the level of a signal line 27 becomes high or low in accordance with the direction of the running of the video tape in a slow mode whereas the signal line is opened in other modes. Accordingly, when the signal line 27 is opened, the threshold level as a reference value for comparison in the operational amplifier 6 takes a value which is obtained by addition/subtraction of the hysteresis value to/from the divided voltage (signal line 22) expressing a reference level of the control signal. Further, when the level of the signal line 27 is high or low, the level of the plus input of the operational amplifier 6 shifts in accordance with the ratio of the values of the resistors R16 to R18 so that the threshold level changes in accordance with the shift quantity of the level.

A level detection circuit 3 serves as a block for detecting the output level of the operational amplifier 5 to thereby send out a level control signal 23 indicating a result of the detection. In detail, when the output level of the operational amplifier 5 in the case where the level of the control signal outputted from the control head 1 is zero is defined as a reference level (equal to the level of the signal line 22) and the level different by a predetermined level from the reference level is defined as a criterion level, the level detection circuit 3 generates the level control signal 23 on the basis of a signal level exceeding the criterion level. Further, the level control signal 23 is designed so that the level of the level control signal 23 increases as the output level of the operational amplifier 5 increases whereas the level of the level control signal 23 decreases as the output level of the operational amplifier 5 decreases. Therefore, the level detection circuit 3 includes two operational amplifiers 7 and 8, two diodes D7 and D8, one transistor Q2, eight resistors R21 to R28, and one capacitor C7.

In detail, the signal line 22 indicating a reference level (hereinafter referred to as "reference level 22") is led to the minus-input terminal of the operational amplifier 7 through the resistor R22. Further, the minus-input terminal of the operational amplifier 7 is connected to the plus power source through the resistor R21. Further, the reference level 22 is led to the plus-input terminal of the operational amplifier 8 through the resistor R23, and is connected to the ground through the resistor R24. Accordingly, the level of the minus input of the operational amplifier 7 shifts from the reference level 22 to the high level side (criterion level) by the value determined on the basis of the proportion of the resistors R21 and R22. Further, the level of the plus input of the operational amplifier 8 shifts from the reference level 22 to the low level side (criterion level) by the value determined on the basis of the proportion of the resistors R23 and R24. Further, the output of the operational amplifier 5 is led to both the plus-input terminal of the operational amplifier 7 and the minus-input terminal of the operational amplifier 8.

The anode of the diode D7 is connected to the output terminal of the operational amplifier 7, and the anode of the diode D8 is connected to the output terminal of the operational amplifier 8. Further, the respective cathodes of the diodes D7 and D8 are led to the base of the transistor Q2. Further, the capacitor C7 for providing a time constant and the resistor R27 for electrically discharging the capacitor C7 are connected between the base of the transistor Q2 and the ground level. Accordingly, when the level at the output terminal of the operational amplifier 7 becomes high and the level at the output terminal of the operational amplifier 8 becomes high, the base level of the transistor Q2 increases.

The collector of the transistor Q2 is connected to the ground. Further, the emitter of the transistor Q2 is connected to the plus power source through the resistors R26 and R25. Further, one terminal of the resistor R28 is connected to a junction between the resistors R25 and R26. Further, the level control signal 23 appearing at the other terminal of the resistor R28 is led to a variable feedback resistance circuit 2. The transistor Q2 is connected as described above. Accordingly, the level change at the emitter of the transistor Q2 becomes equal to the level change at the base of the transistor Q2. That is, the transistor Q2 operates as an emitter follower for performing impedance conversion.

In short, the configuration of the level detection circuit 3 is as follows. The output level of the operational amplifier 7 becomes high when the output level of the operational amplifier 5 is higher than the criterion level set to the higher side than the reference level 22. Further, the output level of the operational amplifier 8 becomes high when the output level of the operational amplifier 5 is lower than the criterion level set to the lower side than the reference level 22. Accordingly, the level control signal 23 serves as a signal indicating the quantity by which the peak value of the output level of the operational amplifier 5 exceeds the criterion level.

The variable feedback resistance circuit 2 is provided as a block for changing the equivalent resistance connected between the minus-input and output terminals of the operational amplifier 5. When the level control signal 23 indicates the increase of the output level of the operational amplifier 5, the equivalent resistance value decreases. To the contrary, when the level control signal 23 indicates the decrease of the output level of the operational amplifier 5, the equivalent resistance value increases. Therefore, the variable feedback resistance circuit 2 includes two resistors R11 and R12, and an NPN transistor Q1.

In detail, one terminal of the first resistor R11 is connected to the minus-input terminal of the operational amplifier 5, and the other terminal of the first resistor R11 is connected to the emitter of the NPN transistor Q1. Further, the collector of the NPN transistor Q1 is connected to the output terminal of the operational amplifier 5, and the level control signal 23 is led to the base of the NPN transistor Q1. Further, the second resistor R12 is connected between the collector and base of the NPN transistor Q1. Further, the impedance of the second resistor R12 is set to be substantially equal to the impedance (approximately to the sum of the resistance values of the resistors R28 and R25) of the level control signal 23 observed from the base of the NPN transistor Q1.

Figure 2:
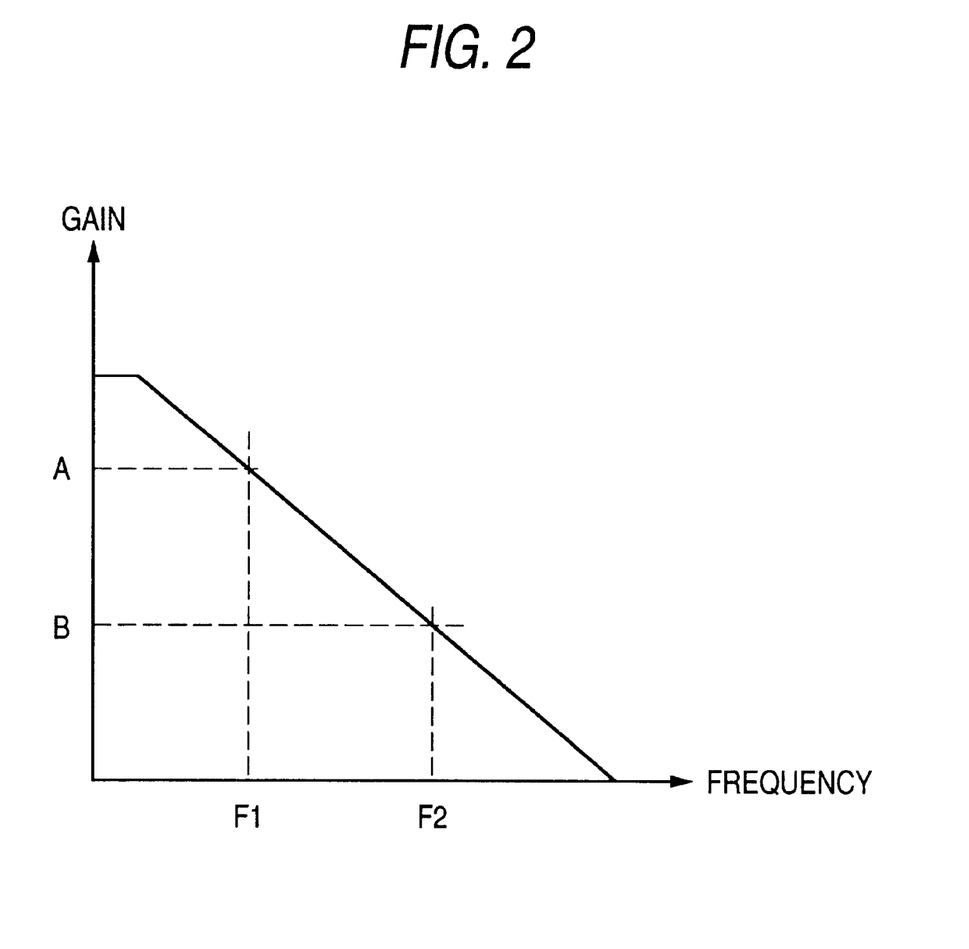
FIG. 2 is an explanatory view showing the relation between the open-loop gain of an operational amplifier (amplification circuit body) and the frequency.

Incidentally, the relation between the open-loop gain of the operational amplifier 5 and the frequency is as shown in FIG. 2. That is, the gain decreases as the frequency increases. On the other hand, when the operational amplifier 5 is operated to obtain an amplification factor of the order of hundreds of times, the open-loop gain must be, for example, not lower than a value A. Accordingly, the usable frequency range when the amplification factor is of the order of hundreds of times is limited to a range of frequency lower than a frequency F1. However, when the quantity of negative feedback is raised to obtain an amplification factor, for example, of the order of tens of times, the open-loop gain does not need to be so high, that is, it is sufficient that the open-loop gain is not lower than a value B. Accordingly, the usable frequency range is widened to the high frequency side, so that the frequency range becomes usable to a frequency F2. That is, even in the state where the connection of the switch 9 is opened, the equivalent resistance value of the variable feedback resistance circuit 2 is reduced so that the frequency range allowed to be amplified by the operational amplifier 5 is widened to the high frequency side when the amplification factor of the operational amplifier 5 is reduced.

Figure 3:
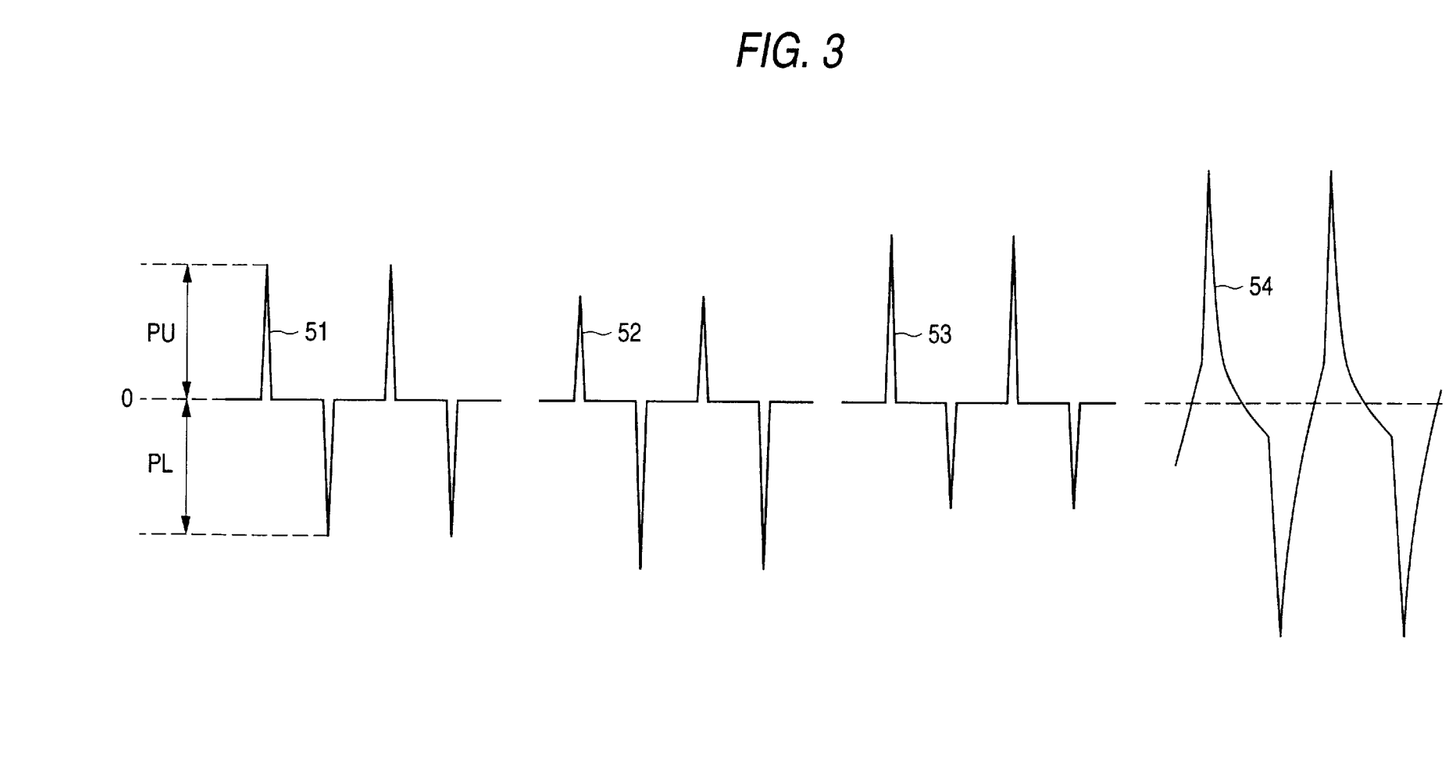
FIG. 3 is an explanatory view showing the signal waveform at the output terminal of the operational amplifier (amplification circuit body) and the auxiliary signal waveform.
Figure 4:
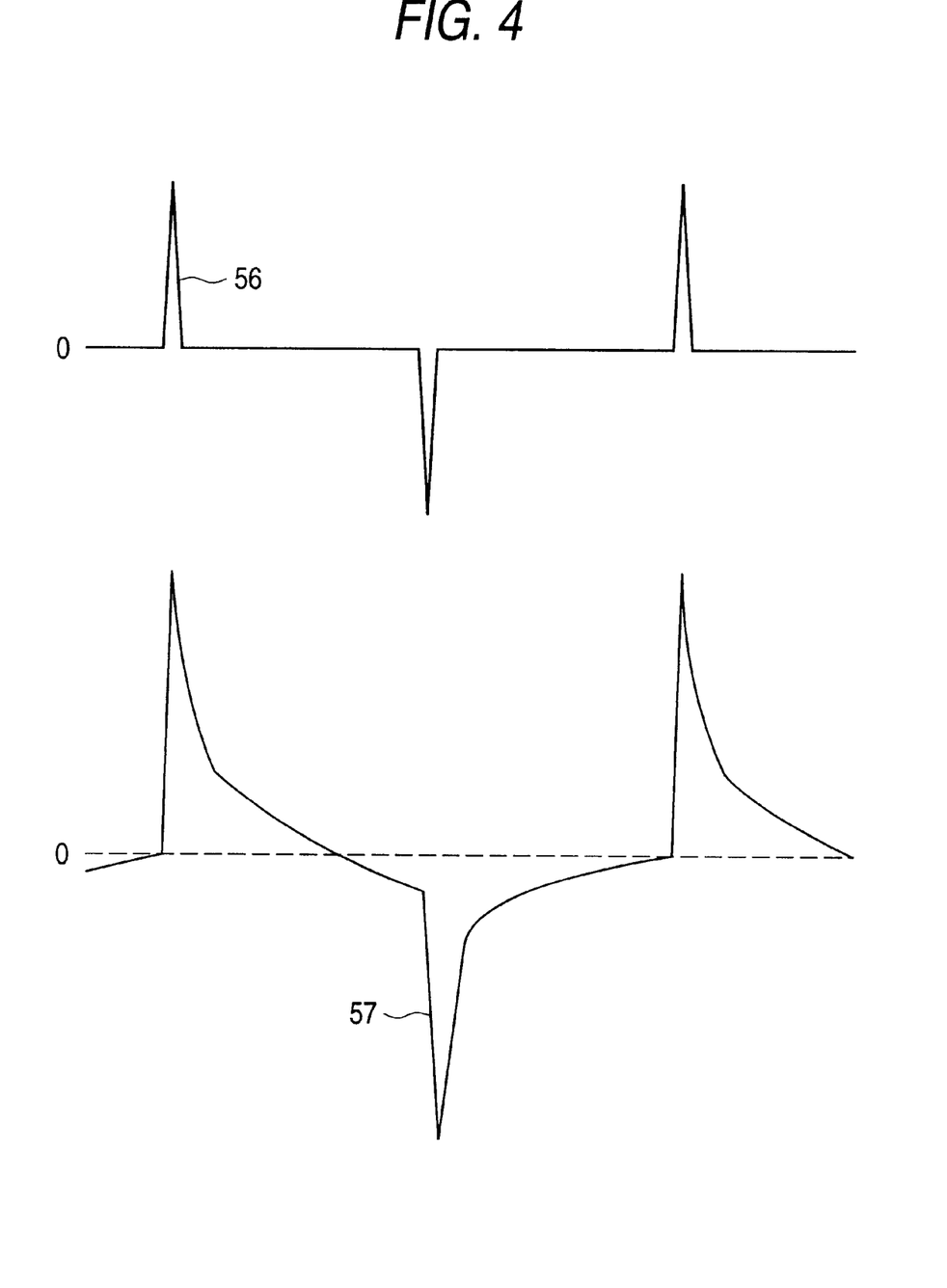
FIG. 4 is an explanatory view showing the signal waveform at the output terminal of the operational amplifier (amplification circuit body) and the auxiliary signal waveform.

FIGS. 3 and 4 are explanatory views showing signal waveform at the output terminal of the operational amplifier 5 and auxiliary signal waveform. In FIGS. 3 and 4, the reference level indicated by the signal line 22 is shown as zero. Accordingly, the reference level indicated by the signal line 22 will be referred merely to "reference level" hereinafter. The operation of this embodiment will be described below with reference to the drawings if required.

Assume now that the connection of the switch 9 is opened because the operation is neither "fast feed" nor "rewind". In this occasion, the amplification factor of the operational amplifier 5 is determined on the basis of the ratio of the value of the resistor R6 to a synthesized value of the equivalent resistance of the variable feedback resistance circuit 2 and the resistor R9 connected in parallel with the equivalent resistance. On the other hand, the equivalent resistance of the variable feedback resistance circuit 2 is determined on the basis of the current flowing in the base of the NPN transistor Q1. The operation will be described below in detail.

The level change of the minus input of the operational amplifier 5 is coincident with the level change of the plus input of the operational amplifier 5. Accordingly, when the level of the plus input of the operational amplifier 5 becomes low, the emitter level of the NPN transistor Q1 is moved down to the low level side. When the level of the plus input becomes high, the emitter level of the NPN transistor Q1 is moved up to the high level side. Accordingly, when the level of the plus input is so low that the emitter level of the NPN transistor Q1 is moved down to the low level side, the base current of the NPN transistor Q1 increases and the equivalent resistance value between the collector and emitter decreases. As a result, the amplification factor of the operational amplifier 5 decreases. To the contrary, when the level of the plus input is so high that the emitter level of the NPN transistor Q1 is moved up to the high level side, the base current of the NPN transistor Q1 decreases and the equivalent resistance value between the collector and emitter increases. As a result, the amplification factor of the operational amplifier 5 increases.

On the other hand, a current based on the second resistor R12 also flows in the base of the NPN transistor Q1. Accordingly, the following relation is established. That is, the direction of change of the collector level of the NPN transistor Q1 is equal to the direction of change of the level given to the plus input of the operational amplifier 5. Accordingly, when the level of the plus input is low, the collector level becomes low so that the base current supplied through the second resistor R12 is small. As a result, the equivalent resistance value between the collector and emitter increases, so that the amplification factor of the operational amplifier 5 increases. To the contrary, when the level of the plus input is high, the collector level becomes high so that the base current supplied through the second resistor R12 increases. As a result, the equivalent resistance value between the collector and emitter decreases, so that the amplification factor of the operational amplifier 5 decreases.

From the above description, when the function of controlling the current flowing in the resistor R28 is weaker than the function of controlling the current flowing in the second resistor R12, the amplification factor of the operational amplifier 5 in the case where the input level takes a lower-side peak value becomes larger than the amplification factor in the case where the input level takes an upper-side peak value. Accordingly, the signal waveform at the output terminal of the operational amplifier 5 is shaped such that, as shown by reference numeral 52 in FIG. 3, the peak value in the lower side with respect to the reference level is large and the peak value in the upper side with respect to the reference level is small. This situation occurs when the impedance of the level control signal 23 observed from the base of the NPN transistor Q1 is higher than that of the second resistor R1.

To the contrary, when the function of controlling the current flowing in the resistor R28 is more intensive than the function of controlling the current flowing in the second resistor R12, the amplification factor of the operational amplifier 5 in the case where the input level takes a lower-side peak value becomes smaller than the amplification factor in the case where the input level takes an upper-side peak value. Accordingly, the signal waveform at the output terminal of the operational amplifier 5 is shaped such that, as shown by reference numeral 53 in FIG. 3, the peak value in the lower side with respect to the reference level is small and the peak value in the upper side with respect to the reference level is large. This situation occurs when the impedance of the level control signal 23 observed from the base of the NPN transistor Q1 is lower than that of the second resistor R1.

On the other hand, when the impedance of the level control signal 23 observed from the base of the NPN transistor Q1 is set to be substantially equal to that of the second resistor R12 so that the function of controlling the current flowing in the resistor R28 is made substantially coincident with the function of controlling the current flowing in the second resistor R12, the amplification factor of the operational amplifier 5 in the case where the input level takes a lower-side peak value becomes substantially equal to the amplification factor in the case where the input level takes an upper-side peak value. Accordingly, the signal waveform at the output terminal of the operational amplifier 5 is shaped such that, as shown by reference numeral 51 in FIG. 3, the peak value PL in the lower side with respect to the reference level is equal to the peak value PU in the upper side with respect to the reference level. That is, the operational amplifier 5 carries out the operation to satisfy the characteristic required for a control signal amplifier.

Incidentally, the signal waveforms shown by reference numerals 51 to 53 in FIG. 3 are signal waveforms obtained in the case where a quintuple-speed searching operation is executed in the long-playing mode. On the other hand, the signal waveform shown by reference numeral 54 is an output signal waveform obtained in the case where the automatic control of the amplification factor of the operational amplifier 5 is stopped and the operational amplifier 5 is operated to obtain an amplification factor of the order of hundreds of times. When the operational amplifier 5 is operated with an amplification factor of the order of hundreds of times as described above, the amplification factor in a high-frequency region becomes so insufficient that the pulse width of control pulses is spread in the neighborhood of the reference level. The spread of width brings the edge displacement of control pulses outputted from the operational amplifier 6. This causes a tracking error.

However, when the quantity of negative feedback is increased on the basis of the equivalent resistance of the variable feedback resistance circuit 2, the amplification factor of the operational amplifier 5 is suppressed so greatly that the amplification factor in a high-frequency region is kept substantially equal to that in a low-frequency region. Accordingly, pulses which appear at the output terminal of the operational amplifier 5 are narrow-width pulses as shown by reference numeral 51. Accordingly, the pulse width of control pulses outputted from the operational amplifier 6 is kept narrow, so that tracking error is prevented from occurring. Further, the signal waveform at the output terminal of the operational amplifier 5 is shaped so that the peak value in the lower side with respect to the reference level is substantially equal to the peak value in the upper side with respect to the reference level. Accordingly, even in the case where the level of the signal line 27 is high or low and the threshold level of the operational amplifier 6 is changed, accurate control pulses are sent out from the operational amplifier 6.

Further, in FIG. 4, reference numerals 56 and 57 show signal waveforms at the output terminal of the operational amplifier 5 when the connection of the switch 9 is opened and a triple-speed searching operation is carried out in the standard-playing mode. The waveform 56 is a signal waveform obtained when the amplification factor of the operational amplifier 5 is controlled by the variable feedback resistance circuit 2. That is, the amplification factor of the operational amplifier 5 is suppressed so that the same amplification factor as obtained in a low-frequency region is secured in a high-frequency region. Accordingly, the pulse width of control pulses which appear at the output terminal of the operational amplifier 5 is narrow. On the other hand, the waveform 57 is a signal waveform obtained when the operational amplifier 5 is operated with an amplification factor of the order of hundreds of times. In this case, the frequency characteristic is insufficient, so that the signal waveform is deformed. As a result, the pulse width of control pulses which appear at the output terminal is spread.

Further, the operation in the case where the connection of the switch 9 is closed for "fast feed" or "rewind" is the same as that described above, so that the amplification factor of the operational amplifier 5 is controlled to take an optimum value in accordance with the "fast feed" or "rewind" speed.

As described above, in this embodiment, the criterion level is set for each of the upper level side and the lower level side with respect to the reference level 22. Accordingly, even in the case where there arises the situation that the plus-side level of pulses of the control signal reproduced by the control head 1 is greatly different from the minus-side level of the pulses in a "slow play" mode, or the like, the output level of the operational amplifier 5 can be kept constant.

As described above, the control signal amplification circuit includes a level detection circuit for detecting an output level of an amplification circuit body having an amplification factor determined on the basis of a quantity of feedback fed back from an output terminal of the amplification circuit body to a minus-input terminal of the amplification circuit body to thereby send out a level control signal indicating a result of the detection, and a variable feedback resistance circuit which is connected between the minus-input terminal and the output terminal of the amplification circuit body so that an equivalent resistance value of the variable feedback resistance circuit decreases when the level control signal indicates increase of the output level, and the equivalent resistance value of the variable feedback resistance circuit increases when the level control signal indicates decrease of the output level. Accordingly, when a control signal of a high frequency is to be amplified, the amplification circuit body operates in a state in which the frequency band allowed to be used is widened in the high frequency side. Accordingly, even in the case where the control signal contains a signal component of a frequency band in which the open-loop gain is reduced, the control signal can be amplified without deformation of its waveform.

What is claimed is:

1. A control signal amplification circuit for amplifying a control signal reproduced by a control head, comprising:

a level detection circuit for detecting an output level of an amplification circuit body having an amplification factor determined on the basis of a quantity of feedback fed back from an output terminal of the amplification circuit body to a minus-input terminal of the amplification circuit body to thereby send out a level control signal indicating a result of the detection; and a variable feedback resistance circuit which is connected between the minus-input terminal and the output terminal of the amplification circuit body so that an equivalent resistance value of said variable feedback resistance circuit decreases when the level control signal indicates increase of the output level, and the equivalent resistance value of said variable feedback resistance circuit increases when the level control signal indicates decrease of the output level, said level detection circuit generating the level control signal on the basis of a signal level exceeding a criterion level when the output level of the amplification circuit body in the case where the level of the control signal reproduced by the control head is zero is defined as a reference level and a level different from the reference level by a predetermined level is defined as the criterion level.

2. The control signal amplification circuit according to claim 1, further comprising means for generating the control signal by reproducing a control signal recorded on a video tape.

3. A control signal amplification circuit for amplifying a control signal reproduced by a control head, comprising:

a level detection circuit for detecting an output level of an amplification circuit body having an amplification factor determined on the basis of a quantity of feedback fed back from an output terminal of the amplification circuit body to a minus-input terminal of the amplification circuit body to thereby send out a level control signal indicating a result of the detection; and a variable feedback resistance circuit which is connected between the minus-input terminal and the output terminal of the amplification circuit body so that an equivalent resistance value of said variable feedback resistance circuit decreases when the level control signal indicates increase of the output level, and the equivalent resistance value of said variable feedback resistance circuit increases when the level control signal indicates decrease of the output level, said level detection circuit reducing the level of the level control signal when the output level of the amplification circuit includes: a first resistor having one terminal connected to the minus-input terminal of the amplification circuit body; an NPN transistor having an emitter connected to the other terminal of said first resistor, a collector connected to the output terminal of the amplification circuit body, and a base supplied with the level control signal; and a second resistor connected between the base and collector of said NPN transistor.

4. The control signal amplification circuit according to claim 3, wherein an impedance of said second resistor is selected to be substantially equal to that of the level control signal observed from the base of said NPN transistor.

* * * * *